Figure 1:
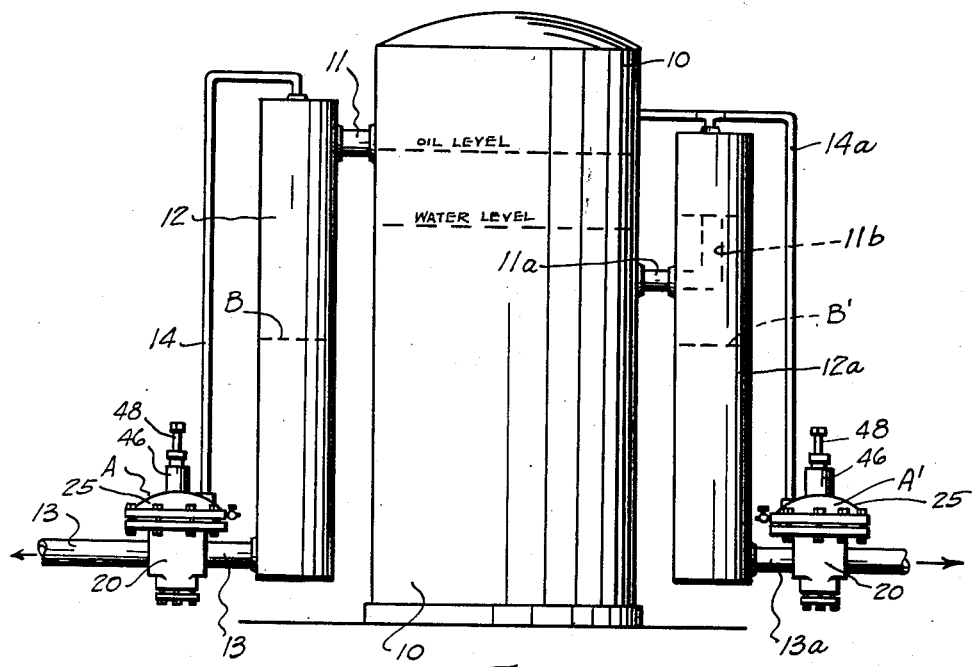

Feb. 23, 1954 — A. S. PARKS — 2,670,006
DUMP VALVE

Filed April 26, 1948 — 2 Sheets-Sheet 1

Inventor
Asbury S. Parks
By Joe E. Edwards
Attorney

Feb. 23, 1954　　　　　　A. S. PARKS　　　　　　2,670,006
DUMP VALVE

Filed April 26, 1948　　　　　　　　　　　　2 Sheets-Sheet 2

Inventor
Asbury S. Parks

By Joe E. Edwards
Attorney

Patented Feb. 23, 1954

2,670,006

UNITED STATES PATENT OFFICE 2,670,006

DUMP VALVE

Asbury S. Parks, Houston, Tex., assignor to Joe E. Edwards, Houston, Tex.

Application April 26, 1948, Serial No. 23,358

14 Claims. (Cl. 137—407)

This invention relates to new and useful improvements in dump valves.

The invention relates particularly to salt water or oil dump valves such as are used for controlling the escape of water or oil from emulsion treaters, tanks or other vessels wherein it is desirable to maintain a predetermined liquid level.

One object of the invention is to provide an improved valve for controlling the escape of liquid from a vessel, which valve is actuated in accordance with variations in the level of the liquid within said vessel, whereby said liquid may be automatically maintained at a predetermined or desired level.

An important object of the invention is to provide an improved escape or dump valve for controlling the escape of liquid from a closed pressure vessel, wherein the valve is actuated in accordance with variations in the level of said liquid and also wherein any changes in the pressure within the vessel to which the liquid is subjected, do not affect operation of the valve, whereby a predetermined liquid level may be accurately maintained regardless of pressure variations which might occur in said vessel.

Another object of the invention is to provide an improved dump or escape valve, of the character described, which is effectively balanced so that the valve is actuated solely in accordance with variations in the liquid level of the liquid being controlled and its operation is not affected or varied by variations in pressure which may occur within the liquid vessel.

A further object of the invention is to provide an improved valve, of the character described, which is so constructed that the valve will throttle from full open to full closed position over a relatively small range, whereby extremely sensitive operation of the valve may be had.

A still further object of the invention is to provide an improved valve, of the character described, which has only a single seating surface whereby the necessity of providing a guide stem for guiding the movement of the valve, such as is necessary in double seating valves, is eliminated; the elimination of a guide stem and double seat not only simplifying the structure but also obviating the difficulties resulting from the accumulation of deposits upon the usual guide stem or upon the seating surface of the valve.

A particular object of the invention is to provide an improved dump valve, of the character described, wherein the valve member is formed by a flexible element arranged to engage an annular seat, with said element having the forces acting on opposite sides to maintain the valve closed under predetermined conditions; unbalancing of the forces acting on said valve which moves the valve to an open position being accomplished solely by the weight of the liquid column being controlled so that pressure variations occurring in the liquid vessel do not affect operation of the valve.

The construction designed to carry out the invention will be hereinafter described together with other features of the invention.

Figure 3:
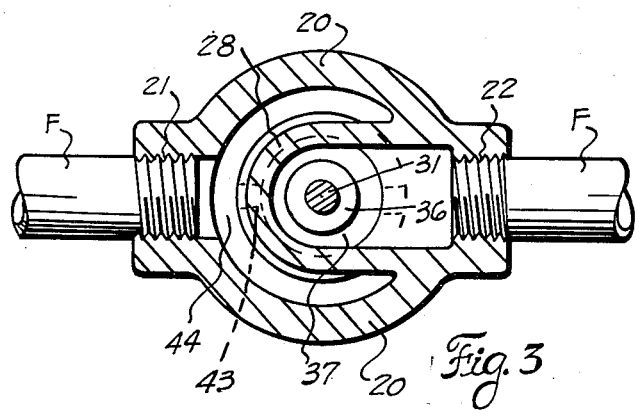
Figure 2:
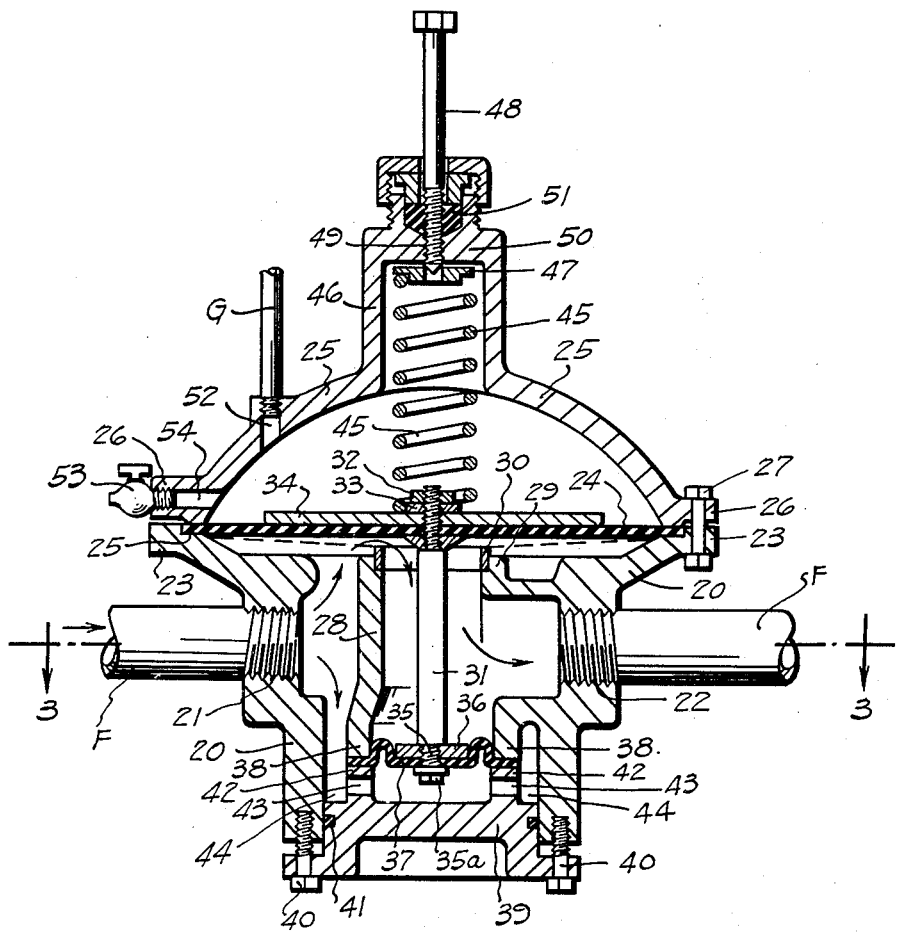

The invention will be more readily understood from a reading of the following specification and by reference to the accompanying drawing, wherein an example of the invention is shown, and wherein:

Figure 1 is an elevation of an emulsion treater, illustrating a dump valve, constructed in accordance with the invention, connected therewith for controlling the escape of oil and water from said treater, Figure 2 is an enlarged, transverse, vertical, sectional view of the improved dump valve, and Figure 3 is a horizontal, cross-sectional view taken on the line 3—3 of Figure 2.

In the drawings, the numeral 10 designates an emulsion treater which may be of any desired construction. As is well known, an emulsion treater comprises a tank or vessel wherein the emulsified oil and water are separated through the application of heat and suitable chemicals. Breaking up of the emulsion permits gravity to settle the water to the bottom of the tank while the oil rises to the top. The oil is drawn from the tank 10 through an oil overflow pipe 11 which communicates with a vertical leg 12. The lower end of the leg has an outlet pipe 13 connected therein and a dump valve A, constructed in accordance with the invention, is connected in the outlet pipe 13 for controlling the escape of the oil from the leg or reservoir 12. In ordinary practice some working level is established in the leg or reservoir 12 and when the oil in said leg rises above the level as indicated at B in Figure 1, the dump valve A opens. The valve remains open until the level is lowered to the point B at which time it closes. The valve A is connected through a gas equalizing pipe 14 with the upper end of the leg or reservoir 12.

The water from the emulsion treater or tank 10 is drained off through an outlet 11a and this outlet has connection with a vertical riser 11b which has its upper end open so that the water may overflow into a vertical leg or reservoir 12a.

An escape or outlet pipe 13a extends from the lower end of the water leg 12a and has a dump valve A', constructed in accordance with the invention, connected therein. The working level within the water leg may be at any desired point and is arbitrarily indicated at B' in Figure 1. Whenever the water level rises above this point the dump valve automatically opens and remains open until the level is lowered. The valve A' has connection through a gas equalizing line 14a with the upper end of the water leg or reservoir 12a and with the upper end of the tank 10.

It is noted that the emulsion treater is illustrated merely to show one application of the improved dump valve and no claim is made to said treater. As a matter of fact, the valves A and A' which are duplicates in construction may be used with other devices for controlling the escape of liquid from a tank or vessel.

The improved dump valve which comprises the present invention is clearly illustrated in Figure 2 and includes an annular housing 20 which is provided with diametrically opposed screw threaded openings 21 and 22, whereby the flow line F which may be either the line 13 or 13a shown in Figure 1, may be connected therewith. The upper end of the housing is flared upwardly and outwardly to form an annular flange 23 and a flexible diaphragm which as illustrated forms a valve element 24, has its marginal edge portions seated within an annular groove 25 formed in the upper surface of the flange. The diaphragm is clamped in position by a bell shaped dome or closure 25 which is formed with an annular flange 26 at its lower portion, whereby bolts 27 may securely fasten the housing 20 and dome 25 to each other.

Within the housing 20 a generally U-shaped partition or wall 28 is formed and surrounding the upper end of this partition is an annular collar 29 within which a valve seat member 30 is mounted. As is clearly shown in Figure 2 the provision of the partition provides a flow passage through the housing and past the valve seat 30. The flexible valve element 24 is adapted to move downwardly into engagement with the seat to close flow through this passage.

The flexible valve element 24 has the upper end of an axial stem 31 extending therethrough and secured in position by a nut 32, a suitable washer 33 and reinforcing plate 34 being interposed between the nut and said element. The stem 31 extends downwardly within the valve housing and has its lower end provided with a reduced threaded pin 35 which extends through an enlarged washer 36 and also through a lower diaphragm 37 and receives a nut 35a to fasten the parts together. The lower diaphragm has its marginal edges engaging the lower end of a collar 38 which is formed integral with the wall of the partition 28. This marginal edge of the lower diaphragm is held in position by a flanged retaining member 39 which is inserted into the lower open end of the valve housing 20 and which is secured thereto by bolts 40. A suitable packing 41 seals the joint between the retainer member and the housing.

As is clearly shown in Figure 2 the retaining element is provided with an upstanding ring 42 which has substantially the same diameter as the lower diaphragm 37 and the collar 38 and this ring is provided with ports 43. The outer surface of the ring 42 is spaced from the wall of the housing, whereby an annular channel 44 is formed around said ring. It will be evident that the pressure of the fluid in the upstream side of the flow line may be exerted through the ports 43 against the underside of the lower diaphragm. This lower diaphragm has an effective cross-sectional area which is equal to the cross-sectional area of the opening formed by the valve seat. Thus, it will be seen that with the valve closed, that is, with the diaphragm 24 engaging the seat 30, the pressure in the flow line will be acting upwardly against the entire underside of the valve element 24 which the exception of that portion of the diaphragm covering the opening through the seat. Since the lower diaphragm 37 is of the same cross-sectional area as this opening, the pressure in the flow line acting against this diaphragm causes the flow line pressure to act against an area equivalent to the total effective area of the underside of the diaphragm 24.

Upward movement of the diaphragm or valve element 24 is resisted by a coil spring 45 which has its lower end engaging the supporting plate 34. The upper end of the spring is disposed within a cylinder 46 which is formed integral with the dome 25. A flanged upper plug 47 engages the upper end of the spring and is in turn engaged by an adjusting stem 48 which is threaded through an axial opening 49 formed in the top 50 of the cylinder. A suitable packing gland 51 seals off around the adjusting screw 48. A gas equalizing pipe G, which may be either of the pipes 14 or 14a of Figure 1, is connected into a passage 52 which is provided in the dome 25 and thus, the upper end of the diaphragm element 24 is subjected to the gas pressure which may be present in the liquid vessel. This gas pressure, together with predetermined adjusted pressure of the spring 45 urges the valve element 24 to its closed or seated position. A suitable pet cock or valve 53 for bleeding the dome 25 may be connected into a suitable passage or escape port 54 provided in the flange 26 of the dome.

In the operation of the device, the spring 45 is adjusted to exert a predetermined force upon the valve element or diaphragm 24 to urge the same toward its seated position. Any gas pressure present within the vessel containing the liquid to be controlled is conducted into the dome 25 to act against the upper surface of the diaphragm 24, this pressure, of course, being added to the spring 45. The underside of the diaphragm or valve element, with the exception of that portion within the opening of the valve seat is acted upon by the pressure of the liquid plus the pressure of the gas because obviously the gas is applied to the liquid. This liquid and gas pressure is also acting against the lower end of the smaller diaphragm 37 which as has been pointed out, is of the same cross-sectional area as the opening through the valve seat and thus, the area of the lower diaphragm is added to the effective area of the diaphragm 24 since its pressure is transmitted through the stem 31. Therefore, it will be evident that the same effective areas are exposed to pressure on both sides of the diaphragm 24.

Since the upper effective area of the diaphragm 24 is acted upon by the gas pressure plus the pressure of the spring 45 and the lower effective area of the diaphragm is acted upon by the gas pressure plus the weight of the liquid column, it will be evident that when the liquid column exceeds a weight sufficient to overcome the adjusted pressure of the spring 45, the valve element 24 will be raised off its seat. When this occurs, a flow of liquid past the valve seat and outwardly through the flow line may occur. Ordinarily the flow line is open to atmosphere so that for all practical purposes the upper end of the diaphragm 37 is never acted upon by any appreciable pressure. For this reason, it may not be essential to positively connect the stem 31 to the lower diaphragm, as with the nut 35a, since the force against the diaphragm is upward; however, it is apparent that some seal around the stem is necessary and the nut 35a is a convenient means of accomplishing such seal.

After the valve has opened, liquid continues to escape past the valve seat until the liquid level in the vessel falls to a point where its weight is insufficient to maintain the diaphragm 24 open against the pressure of the spring 45 and the gas within the dome. At this time the valve closes and remains so until the liquid has again built up so that its weight combined with the gas pressure is again sufficient to open said valve.

It is pointed out that with the provision of the lower or smaller diaphragm having an area substantially equal to the opening through the valve seat, it is possible to equalize or balance the valve element; in other words, the same effective area is exposed to the pressure within the upstream side of the flow line as the area which is exposed to the gas pressure within the dome 25. Thus, the effect of gas pressure within the liquid vessel is nullified since it is acting on the same effective areas on opposite sides of the valve element. This results in the valve being controlled in its operation solely by the differential in the force of the spring 45 and weight of the liquid column. Manifestly, by adjusting the spring, the point at which the valve is opened may be accurately controlled. It will be apparent that variations in the gas pressure within the liquid vessel will not enter into or affect the operation of the valve and thus an accurate control of liquid level may be obtained.

The device is simple in construction and is extremely sensitive in operation because variations in pressures acting on the liquid within the vessel do not affect the operation of the valve. The valve provides only a single seat which eliminates the necessity of a guide stem such as is ordinarily employed in double seat valve arrangements. This obviates the accumulation of deposits either on the guide or on the valve seats which deposits materially interfere with valve operation. It will, of course, be evident that the particular size of the valve element 24 is subject to variation as is the size of the lower diaphragm; so long as the lower diaphragm has an effective area equal to the opening through the valve seat, the purposes of the invention will be accomplished.

The diaphragm 24 has been shown and described as the valve element but obviously, the invention is not limited to this construction. It would be possible to provide a separate valve element for engaging the valve seat, with such valve element having its upper end engaged by or secured to the diaphragm 24, whereby any downward force on the diaphragm would be imparted to the valve element. In this instance, such separate valve element would, of course, be connected to the lower diaphragm 37, the cross-sectional area of which would equal the effective area of contact between the valve element and upper diaphragm.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A dump valve for controlling the escape of liquid from a vessel to maintain a predetermined liquid level in said vessel, said valve including, a valve housing having a flow passage extending therethrough and communicating with the liquid vessel whereby the liquid may flow through said passage, a valve seat within the passage, a valve member movable relative to the seat for controlling flow through the passage, a main pressure responsive means having one side connected to the valve member for controlling movement thereof, that side of the pressure-responsive means having connection with the valve member and reduced in effective area by the area of the valve seat engaged by said member when the valve member is seated being exposed to the liquid in the vessel, the opposite side of said pressure-responsive means being exposed to the area above the liquid in said vessel, an auxiliary pressure-responsive means having the same effective area as the area of the valve seat and having one side exposed to the liquid in the vessel, and means for transferring the effect of the liquid upon said auxiliary pressure-responsive means to that side of the main pressure-responsive means which is connected with the valve member.

2. A valve for maintaining a predetermined liquid level within a vessel including, a valve housing having a passage therethrough communicating with the vessel, a valve seat in the passage, a valve member within the passage movable with respect to the seat for controlling the flow therethrough, pressure-responsive means having one side connected with the valve member and controlling actuation of said valve means, said pressure-responsive means having that side which is connected to the valve member exposed to the liquid within the passage and its opposite side exposed to the area above the liquid level in the vessel, the effective area of the side of said pressure-responsive means to which the valve member is connected being reduced in effective area by the area of the valve seat engaged by said valve member, auxiliary means having one side of an effective area equal to the area of the valve seat and exposed to the liquid in the vessel, and means connecting said last named means to the pressure-responsive means to transfer the pressure of the liquid against said auxiliary means to that side of the pressure-responsive means having connection with the valve, whereby the pressure-responsive means and the valve means controlled thereby are actuated solely by the variations in the liquid level.

3. A valve as set forth in claim 2, together with an adjustable resisting means acting upon that side of the pressure-responsive means which is exposed to the area above the liquid level in the vessel.

4. A valve for maintaining a predetermined liquid level within a vessel including, a valve housing having a passage therethrough communicating with the vessel, a valve means within the passage for controlling the flow therethrough, a pressure-responsive member within the housing having connection with the valve means for controlling the actuation of said valve means and having the area of one side less the effective area of the valve means exposed to the liquid within the passage when the valve is closed, the opposite side of the pressure responsive means being exposed to the pressure within the vessel above the liquid whereby said liquid will move the pressure-responsive means to move said valve means to open and closed positions in accordance with variations which occur in the level of the liquid within the vessel to thereby control said liquid level, and auxiliary pressure responsive means connected with the valve means and having an effective area equal to the area of valve means, and means for establishing communication between the liquid vessel and the effective area of the auxiliary pressure-responsive member, whereby any variation in pressure within said vessel will not affect operation of said valve means to assure control of the operation of said valve means solely by the variations in liquid level.

5. A valve as set forth in claim 4, and an adjustable resisting means acting on the pressure-responsive member and applied to the side opposite that which is exposed to the liquid whereby a desired or predetermined liquid level may be maintained within the vessel.

6. An escape valve for maintaining a predetermined liquid level within a tank including, a valve housing having a passage extending therethrough with one end of said passage communicating with the lower end of the liquid vessel whereby liquid from said vessel may flow into the passage, an annular valve seat within the passage, a flexible main diaphragm movable with respect to the valve seat to a seated or unseated position for controlling flow through the passage, resilient means acting against the upper surface of the diaphragm for urging the diaphragm downwardly toward a seated position against the valve seat, means for exposing the entire upper surface of said main diaphragm to the pressure within the liquid vessel above the liquid level, the lower surface of the diaphragm except for that portion within the area of the valve seat when the diaphragm is seated being exposed through the valve housing passage to the pressure within the liquid vessel plus the weight of the liquid within said vessel, an auxiliary flexible diaphragm having an effective area substantially equal to the area of the opening through the valve seat and also exposed to the combined vessel pressure and liquid within the passage, and means for transmitting the force from said auxiliary diaphragm to the under side of the main diaphragm.

7. An escape valve, of the character described, including a housing having a flow passage therethrough, an annular valve seat in said passage, a flexible main diaphragm within the housing having its periphery sealed within said housing and having a portion of one side thereof adapted to engage the valve seat to function as a valve member, that side of said diaphragm which faces the valve seat being exposed to the pressure in the passage upstream of the valve seat, an auxiliary diaphragm within the housing having an effective area equal to the effective area of the valve seat and also having one side exposed to the pressure in the passage upstream of the valve seat, and a direct connection between the auxiliary diaphragm and the main diaphragm for transferring the effect of the pressure acting on the auxiliary diaphragm to the main diaphragm.

8. An escape valve as set forth in claim 7, together with means for exposing that side of the main diaphragm which is opposite the side engaging the valve seat to a portion of the pressure which is present in the passage upstream of the valve seat.

9. An escape valve for maintaining a predetermined liquid level within a liquid vessel including, a valve housing having a passage extending therethrough with one end of said passage communicating with the lower end of the liquid vessel whereby liquid from said vessel may flow into the passage, an annular valve seat within the passage, a flexible valve element within the housing and having its outer periphery in sealing engagement therewith, said element being movable with respect to the valve seat to a seated or unseated position for controlling flow through the passage, said element having one side exposed to the liquid in the passage whereby said liquid urges said element toward an open position, the opposite side of the element being exposed to pressure in the area above the liquid within the vessel, resilient means acting on said opposite side of said valve element for urging the element toward its seated position, whereby the pressure of the liquid due to the rise of the liquid level in the vessel and acting on the valve element must reach a predetermined point in order to unseat the valve element to allow flow through the passage, balancing means connected with the valve element and having an effective area equal to the effective area of that portion of the valve element within the valve seat when said element is in seated position, and means for establishing communication between the liquid in the vessel and the effective area of the balancing means whereby any pressure variations occurring in the area above the liquid within the vessel act through the liquid upon one side of the valve element and at the same time also act upon the effective area of the balancing means in opposition to the action of such pressure on the opposite side of the valve element to thereby prevent such pressure variations from affecting the operation of the valve element.

10. An escape valve for maintaining a predetermined liquid level within a tank including, a valve housing having a passage extending therethrough with one end of said passage communicating with the lower end of the liquid vessel whereby liquid from said vessel may flow into the passage, an annular valve seat within the passage, a flexible valve element having its outer edges sealed with the housing wall and movable with respect to the valve seat to a seated or unseated position for controlling flow through the passage, resilient means acting against the upper surface of the valve element for urging the valve element downwardly toward a seated position against the valve seat, means for exposing the entire upper surface of said element to the pressure within the liquid vessel above the liquid level, the lower surface of the element except for that portion within the area of the valve seat when the element is seated being exposed to the pressure within the liquid vessel plus the weight of the liquid within said vessel, through the valve housing passage, an auxiliary pressure responsive means also exposed to the combined vessel pressure and liquid in the passage, and means for transmitting the force from said auxiliary pressure responsive means to the underside of the valve element.

11. A valve as set forth in claim 10, wherein the valve element is a flexible diaphragm.

12. A valve as set forth in claim 10, wherein the auxiliary pressure responsive means has an area equal to that area of the valve element within the confines of the valve seat, whereby the effective areas on opposite sides of said valve element which are exposed to the pressure within the liquid vessel are substantially equal to thereby prevent pressure variations within said vessel from affecting the operation of the valve element.

13. A valve for maintaining a predetermined liquid level within a vessel including, a valve housing having a passage therethrough communicating with the vessel, an annular valve seat in the passage through which flow is directed, a valve member within the passage movable with respect to the seat for controlling the flow through the passage, a main pressure-responsive means having connection with the valve member and controlling actuating of said member, said main pressure responsive means having one side exposed to the liquid within the passage and its opposite side exposed to the area above the liquid level in the vessel, auxiliary pressure responsive means having connection with the valve member so that said auxiliary pressure responsive means, said valve member and said main pressure responsive means are simultaneously movable as a unitary assembly, one side of said auxiliary pressure responsive means having an effective area substantially equal to the area of the valve seat, and means for conducting the liquid pressure from the vessel to act against that side of the auxiliary pressure responsive means having the effective area substantially equal to the valve seat, said side of the auxiliary pressure responsive means which is acted upon by the liquid being so disposed with respect to the valve member and seat that the pressure acting thereagainst moves the auxiliary pressure responsive means in a direction to move the valve member connected therewith with respect to the valve seat in a direction opposite to the direction of flow through the annular valve seat.

14. A valve as set forth in claim 13, together with an adjustable spring means acting upon that side of the main pressure responsive means which is exposed to the area above the liquid level in the vessel.

ASBURY S. PARKS.

References Cited in the file of this patent
UNITED STATES PATENTS

| Number | Name | Date |
|---|---|---|
| 515,703 | Birkery | Feb. 27, 1894 |
| 644,406 | Crawford | Feb. 27, 1900 |
| 858,401 | Lamb | July 2, 1907 |
| 1,195,253 | Naslund | Aug. 22, 1916 |
| 1,596,402 | Chandler | Aug. 17, 1926 |
| 1,851,422 | Durando | Mar. 29, 1932 |
| 2,393,119 | Paasche | Jan. 15, 1946 |